United States Patent [19]
Goda et al.

[11] Patent Number: 5,729,828
[45] Date of Patent: Mar. 17, 1998

[54] FREQUENCY PROCESSING CIRCUIT WITH LOWER SIDEBAND SUPPRESSION AND EMPHASIS

[75] Inventors: Makoto Goda; Shinichi Yamashita, both of Yokohama, Japan

[73] Assignee: Canon Kabushiki Kaisha, Tokyo, Japan

[21] Appl. No.: 206,271

[22] Filed: Mar. 7, 1994

Related U.S. Application Data

[63] Continuation of Ser. No. 586,141, Sep. 21, 1990, abandoned.

[30] Foreign Application Priority Data

Oct. 2, 1989 [JP] Japan ................. 1-258351

[51] Int. Cl.$^6$ ........................... H04B 7/00
[52] U.S. Cl. .................. 455/43; 455/295; 348/438; 348/470; 360/30
[58] Field of Search .................. 455/43, 47, 44, 455/313, 323, 339, 103, 303, 295, 307; 348/437, 438, 439, 470; 358/330, 342; 360/29, 30

[56] References Cited

U.S. PATENT DOCUMENTS

| | | | |
|---|---|---|---|
| 2,212,338 | 8/1940 | Bown | 455/43 |
| 2,215,284 | 12/1940 | Armstrong | 455/43 |
| 3,320,535 | 5/1967 | Broadhead | 455/47 |
| 4,063,290 | 12/1977 | Meticdi et al. | 348/438 |
| 4,193,084 | 3/1980 | Yamagiwa | 455/43 |
| 4,310,920 | 1/1982 | Hayes | 455/103 |
| 4,328,591 | 5/1982 | Baghdady | 455/303 |
| 4,432,079 | 2/1984 | Mackelburg et al. | 455/103 |
| 4,541,118 | 9/1985 | Eastmond et al. | 455/47 |
| 4,698,597 | 10/1987 | Merli et al. | 455/43 |
| 4,831,463 | 5/1989 | Faroudja | 358/330 |
| 4,912,773 | 3/1990 | Schiff | 455/103 |
| 5,001,771 | 3/1991 | New | 455/103 |
| 5,020,133 | 5/1991 | Lohemann | 455/43 |
| 5,136,381 | 8/1992 | Citta et al. | 348/437 |
| 5,142,692 | 8/1992 | Owen | 455/45 |
| 5,159,460 | 10/1992 | Senso | 348/439 |
| 5,227,891 | 7/1993 | Ikeguchi | 358/330 |

Primary Examiner—Edward F. Urban
Attorney, Agent, or Firm—Fitzpatrick, Cella, Harper & Scinto

[57] ABSTRACT

A frequency processing circuit has a suppressing circuit for suppressing a lower sideband wave of an input FM signal whose frequency is modulated, a frequency conversion circuit for converting the frequency of an output of the suppressing circuit, and an emphasizing circuit for emphasizing a lower sideband wave of an output of the frequency conversion circuit. The emphasizing circuit emphasizes a share of the amount of the wave suppressed by the suppressing circuit.

12 Claims, 7 Drawing Sheets

CARRIER : 19MHz
MODULATING SIGNAL : 12MHz
DEVIATION : 20MHz

CARRIER : 19MHz
MODULATING SIGNAL : 12MHz
DEVIATION : 20MHz

FREQUENCY PROCESSING CIRCUIT WITH LOWER SIDEBAND SUPPRESSION AND EMPHASIS

This application is a continuation of application Ser. No. 07/586,141 filed Sep. 21, 1990, now abandoned.

BACKGROUND OF THE INVENTION

1. Field of the Invention

The present invention relates to a frequency processing circuit for use in a video tape recorder (VTR) which records high-definition television signals with frequency modulation.

2. Description of Prior Art

Though a low carrier FM recording is also often used in a VTR with high-definition signals in the same manner as a VTR with normal TV signals (such as NTSC and so on), since the high-definition TV signals treat a wide band, a FM modulator having quite a wide band is necessary.

A typical high-definition TV-VTR using such a low carrier FM recording will be described and then, the present invention will be specifically described according to the structure of the above high-definition TV-VTR. FIG. 1 is a block diagram of the whole VTR.

Referring to FIG. 1, a luminance signal Y and color difference signals PB and PR supplied to input terminals 501, 502 and 503 are each converted to a digital signal by A/D converters 504, 505 and 506, respectively. The luminance signal Y is stored in a frame memory 507 as a digital signal, and the color difference signals PB and PR are line-sequenced by an encoder 508 and stored in the frame memory 507.

Then, the luminance signal Y and the color difference signals PB and PR stored in the frame memory 507 are read as two-system time division multiplex signals (TCI signals) and each is converted to an analog signal by D/A converters 509 and 510.

Furthermore, a predetermined emphasis is laid on the analog outputs by emphasis (emphasizer) circuits 511 and 512, then the analog outputs are FM-modulated and converted to a low band by frequency processing circuits 513 and 514, and recorded on a magnetic tape (recording medium) wound at a predetermined angle around a rotatable drum 515.

On the other hand, in a reproduction operation, reproduced outputs (the luminance signal Y and the line-sequenced color difference signals PB and PR) from the magnetic tape are respectively equalized by equalizers 516 and 517, and then FM-modulated and converted to a high band by frequency processing circuits 518 and 519. Subsequently, the restored signals are respectively de-emphasized by de-emphasis circuits 520 and 521 so as to be returned to the initial signals before being emphasized.

Then, the signals are converted to digital signals by A/D converters 522 and 523 and temporarily stored in a frame memory 524. The luminance signal Y read from the frame memory 524 is converted to an analog signal by a D/A converter 525 and output from an output terminal 526, and the line-sequenced color difference signals PB and PR read from the frame memory are synchronized by a synchronizing circuit 527, respectively converted to an analog signal by D/A converters and 529 and respectively output from output terminals 530 and 531.

The FM modulation carrier frequency and the emphasis amount in the above VTR are shown in Table 1. The maximum deviation after the emphasis operation is, for example, approximately 20 MHz peak-to-peak.

TABLE 1

| FM Carrier Frequency | |
| --- | --- |
| Synchronous Leading Level | 14.00 MHz |
| 0 Level | 16.09 MHz |
| Black Level | 16.32 MHz |
| 127 Level | 19.03 MHz |
| White 100% Level | 21.26 MHz |
| Reference Lamp Signal Leading Level | 22.00 MHz |
| Emphasis | |
| X | 2.5 ± 0.3 |
| T | 0.2 ± 0.02 |

Furthermore, the band of the TCI signal as a modulating signal is 12 MHz and, for example, when the carrier is 19 MHz (gray level) and the modulating signal is a 12 MHz sinusoidal wave, the first sideband wave is 7 MHz and 31 MHz.

Thus, quite a wide band is necessary for the frequency processing circuits 513 and 514 of the high-definition TV-VTR.

FIG. 2 is a block diagram of conventional frequency processing circuits 513 and 514, which have an input terminal 601, a FM modulator 602 having a VHF band, a band-pass filter 603, a mixer 604, a local oscillator 605, a low-pass filter 606 and an output terminal 607.

Modulating signals (a luminance signal and line-sequenced color difference signals) input from the input terminal 601 are each modulated by the FM modulator 602 into a FM signal having a VHF band and the unnecessary portions of each FM signal are cut by the band-pass filter 603. Then, each of the FM signals is converted into a low band by being heterodyned with the frequency of the local oscillator 605 by the mixer 604, passed through the low-pass filter 606 and converted into a desired FM signal.

FIG. 3 shows the frequency spectrum of each component in the above block diagram. In this case, the modulating signal is a sinusoidal wave of 12 MHz and the carrier frequency of the modulator having a VHF band is 77 MHz.

FIG. 3(a) shows the spectrum on the output side of the modulator 602. The carrier of 77 MHz is in the center, the first sideband wave appears at 65 MHz/89 MHz, and the second sideband wave appears at 53 MHz/101 MHz.

FIG. 3(b) shows the spectrum on the output side of the band-pass filter 603. The pass band of the band-pass filter 603 is approximately 77 MHz±15 MHz and the band-pass filter 603 cuts an unnecessary spectrum which returns at 0 frequency in the low band conversion.

FIG. 3(c) shows the spectrum on the output side of the mixer 604. The frequency of the local oscillator 604 is 58 MHz and the FM signal of the carrier of 77 MHz is heterodyned with the carrier of 19 MHz.

FIG. 3(d) shows the final spectrum on the output side of the low-pass filter 606. The low-pass filter 606 has a cut-off frequency of approximately 35 to 40 MHz and cuts the spectrum of the initial FM signal and the local oscillator before the low band conversion.

In the case of such a high-definition TV-VTR, since its band is quite wide, it is likely that the spectrum, which returns at 0 frequency, will, after modulation, easily return into the band. This causes moire after demodulation and lowers the image quality.

Therefore, the band-pass filter 603 which cuts an unnecessary band in the high band region is an extremely important factor for preventing moire after demodulation and it is required that the cut-off characteristic of the filter 603 be steep.

However, from a practical point of view, a band-pass filter which has a VHF band and a steep cut-off characteristic has a complicated structure and is difficult to produce because of the great influence of floating elements.

Therefore, when a high-definition filter is produced in order to enhance the performance of a signal processing circuit, such a filter has disadvantages in that it has a large structure and thus is expensive. Furthermore, in the case of the high frequency wave, since it is more difficult to produce a band-pass filter, it is impossible to set a carrier of a VHF modulator at a sufficiently high frequency and to obtain a modulator having a sufficient linearity.

SUMMARY OF THE INVENTION

With the above problems in view, an object of the present invention is to provide a signal processing circuit which has a simple structure and performs excellently.

In order to achieve the above object, an embodiment of the present invention provides a frequency processing circuit which comprises a suppressing means for suppressing a lower sideband wave of an input FM signal whose frequency is modulated, a frequency conversion means for converting the frequency of an output of the suppressing means, and an emphasizing means for emphasizing the lower sideband wave in an output of the frequency conversion means, and which emphasizes a share of the amount of the wave suppressed by the suppressing means, by the emphasizing means.

According to a frequency processing circuit having the above composition, the suppressing means suppresses a lower sideband wave which causes the return of the spectrum at 0 frequency after the low band conversion.

Furthermore, the emphasizing means returns the spectrum after the low-pass conversion to its initial state before being suppressed by the suppressing means.

As a result, according to the present invention, it is possible to realize a frequency processing which suppresses only a lower sideband wave, which causes moire, in the same manner as in the case where a conventional high-performance band-pass filter is used.

Other objects and features of the present invention will be apparent upon a reading of the following description together with reference to the accompanying drawings.

DETAILED DESCRIPTION OF THE PREFERRED EMBODIMENT

Figure 4:
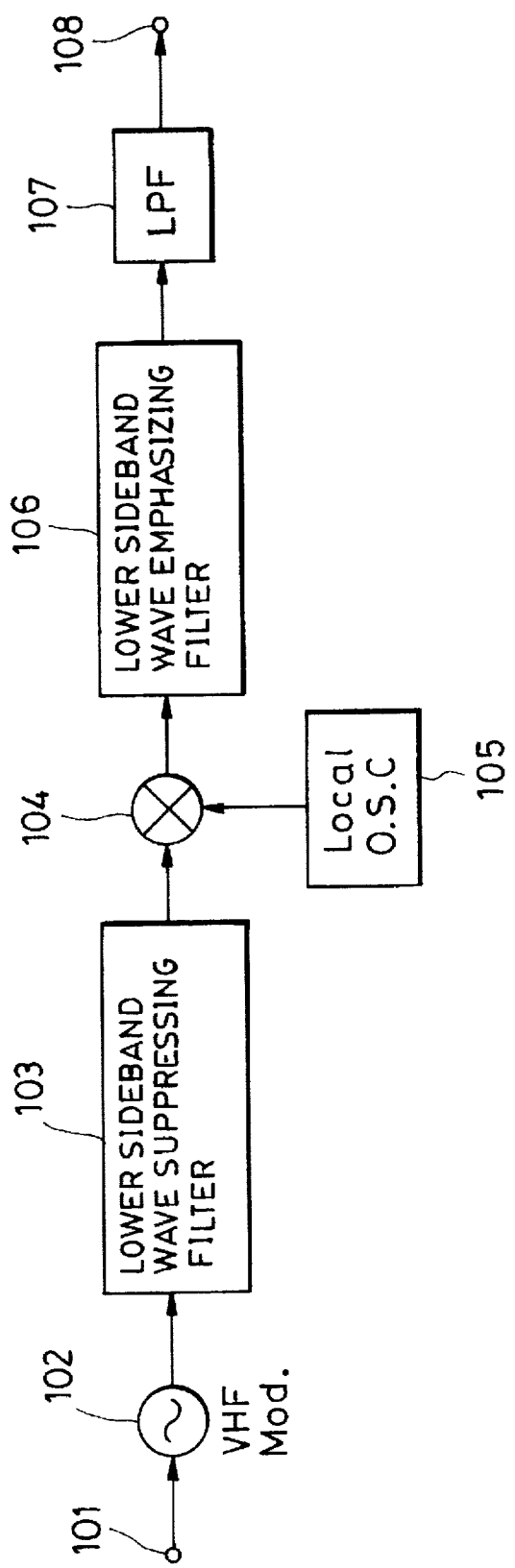
FIG. 4 is a block diagram of an embodiment of the present invention.

FIG. 4 is a block diagram of a frequency processing circuit of an embodiment according to the present invention.

Figure 1:
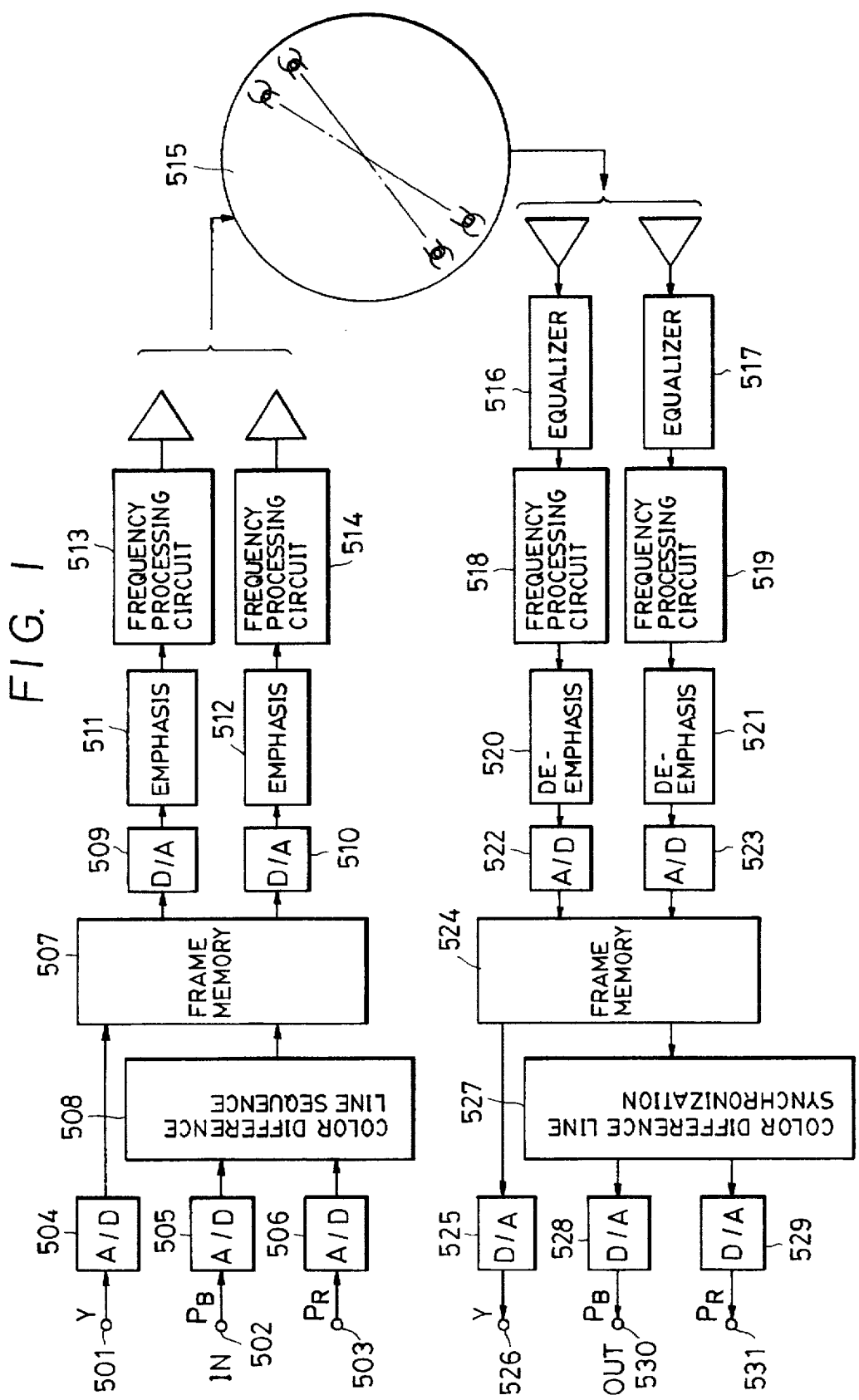
FIG. 1 is a block diagram of a high-definition TV-VTR.
Figure 2:
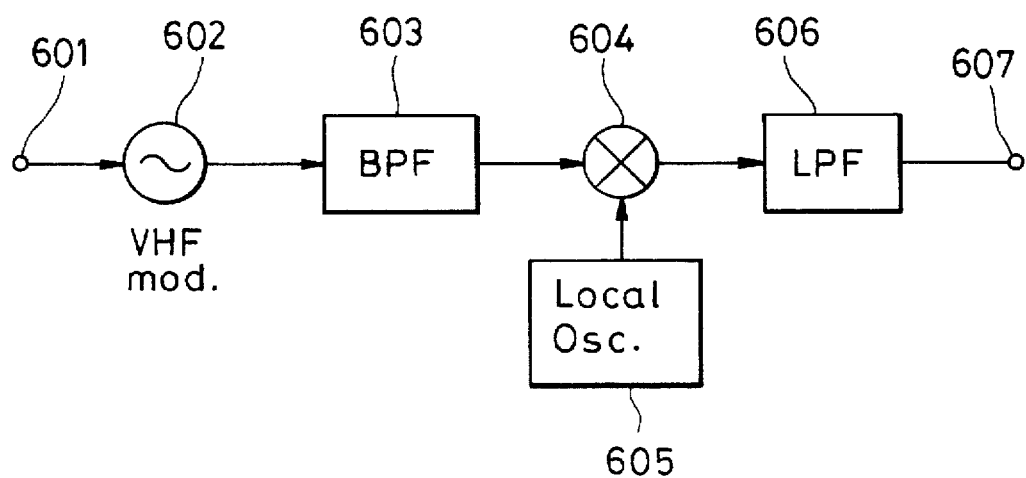
FIG. 2 is a block diagram of a conventional FM modulator.
Figure 3A:
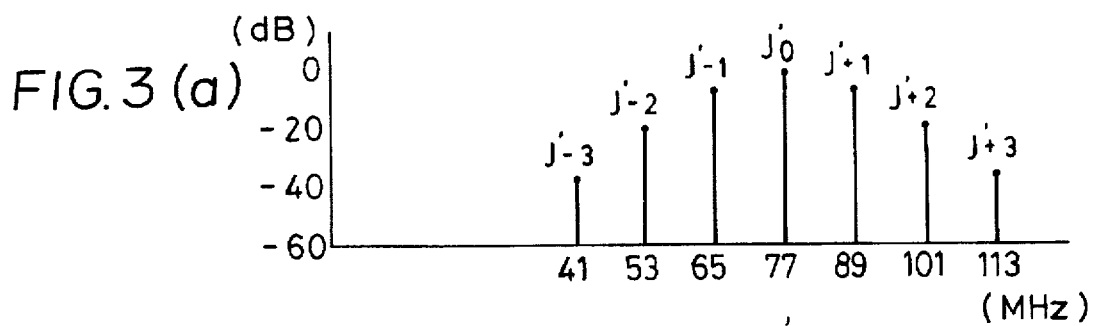
FIGS. 3(a) to (d) show the spectrum of each component in the block diagram shown in FIG. 2.
Figure 3B:
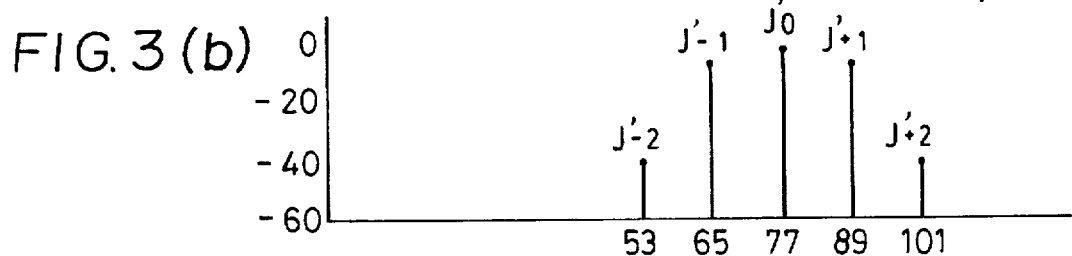
Figure 3C:
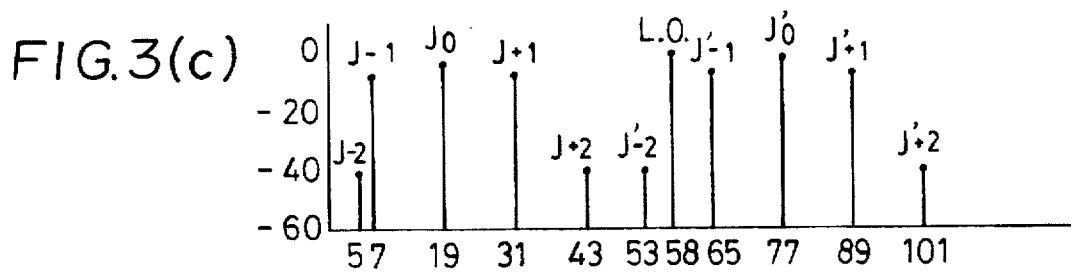
Figure 3D:
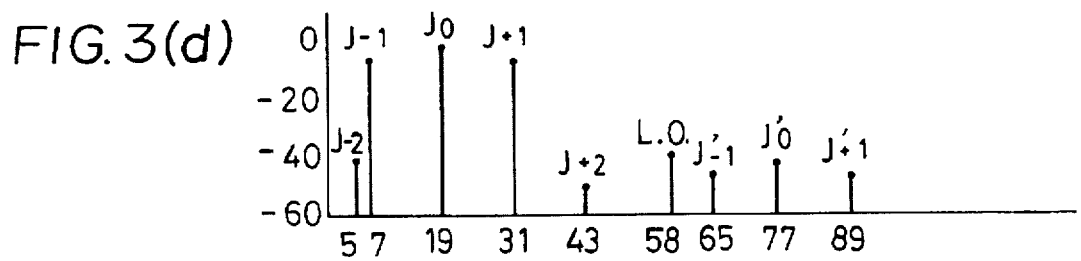

In the embodiment, the present invention is applied to the frequency processing circuit shown in FIG. 1. Referring to FIG. 4, the frequency processing circuit has an input terminal 101, a FM modulator 102 having a VHF band, a lower sideband wave suppressing filter 103 for smoothly suppressing a lower sideband wave, a mixer 104, a local oscillator 105, a lower sideband wave emphasizing filter 106 for smoothly emphasizing the lower sideband wave, a low-pass filter 107, and an output terminal 108.

Figure 5:
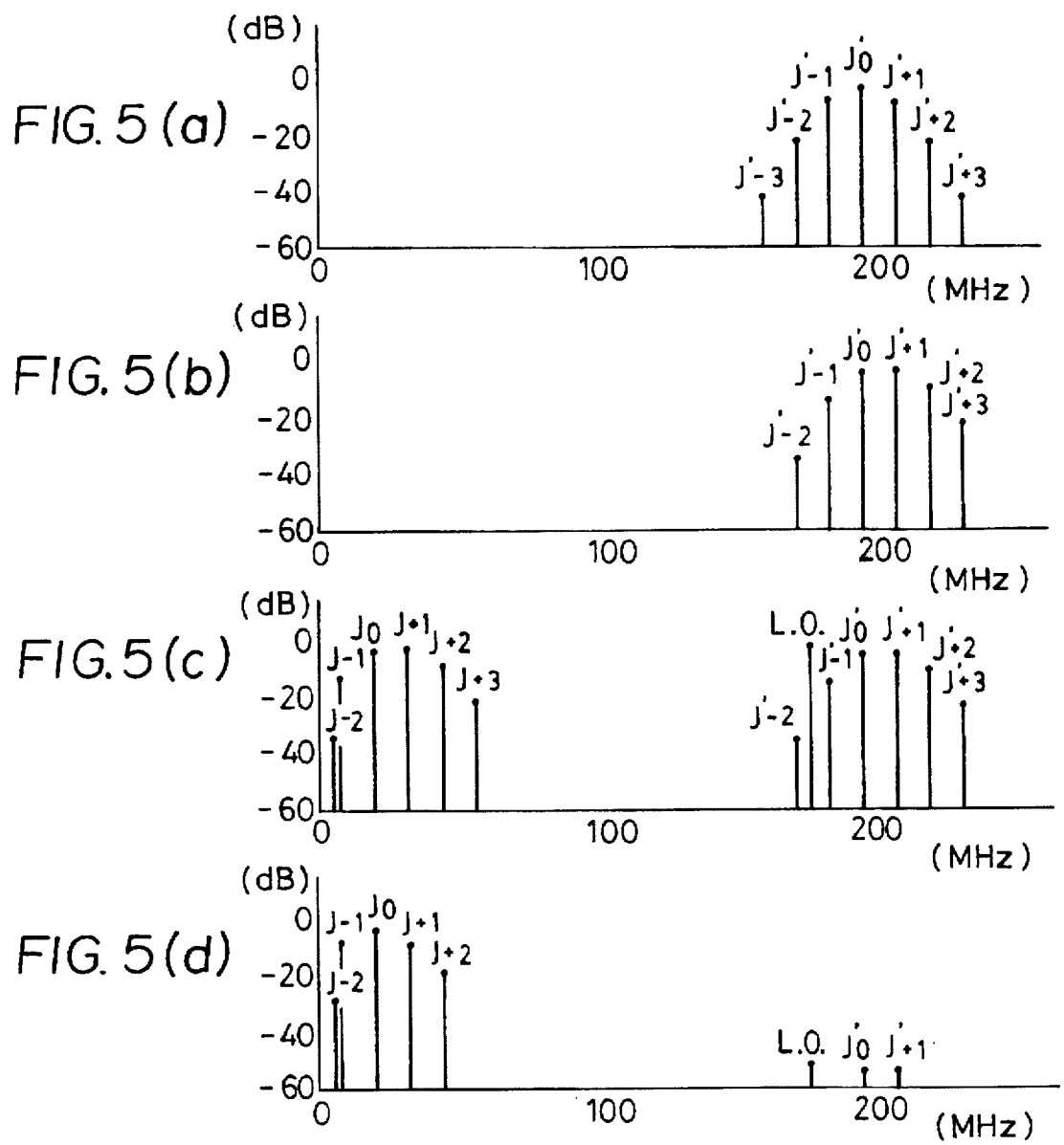
FIGS. 5(a) to 5(d) shows the spectrum of each component in the block diagram shown in FIG. 4.

In FIG. 4, a modulating signal input from the input terminal 101 is modulated by the modulator 102 and converted to a FM signal having a VHF band. The spectrum in this state is shown in FIG. 5(a).

The modulating signal is a sinusoidal wave having an amplitude of 0 to 255 levels and the FM carrier is 193 MHz. Since a conventional steep band-pass filter is not used in the embodiment, it is possible to set the carrier of the VHF modulator at a high frequency of 193 MHz, as described above, and to, in a comparatively easy manner, obtain a modulator having a high linearity in a necessary band.

Figure 6:
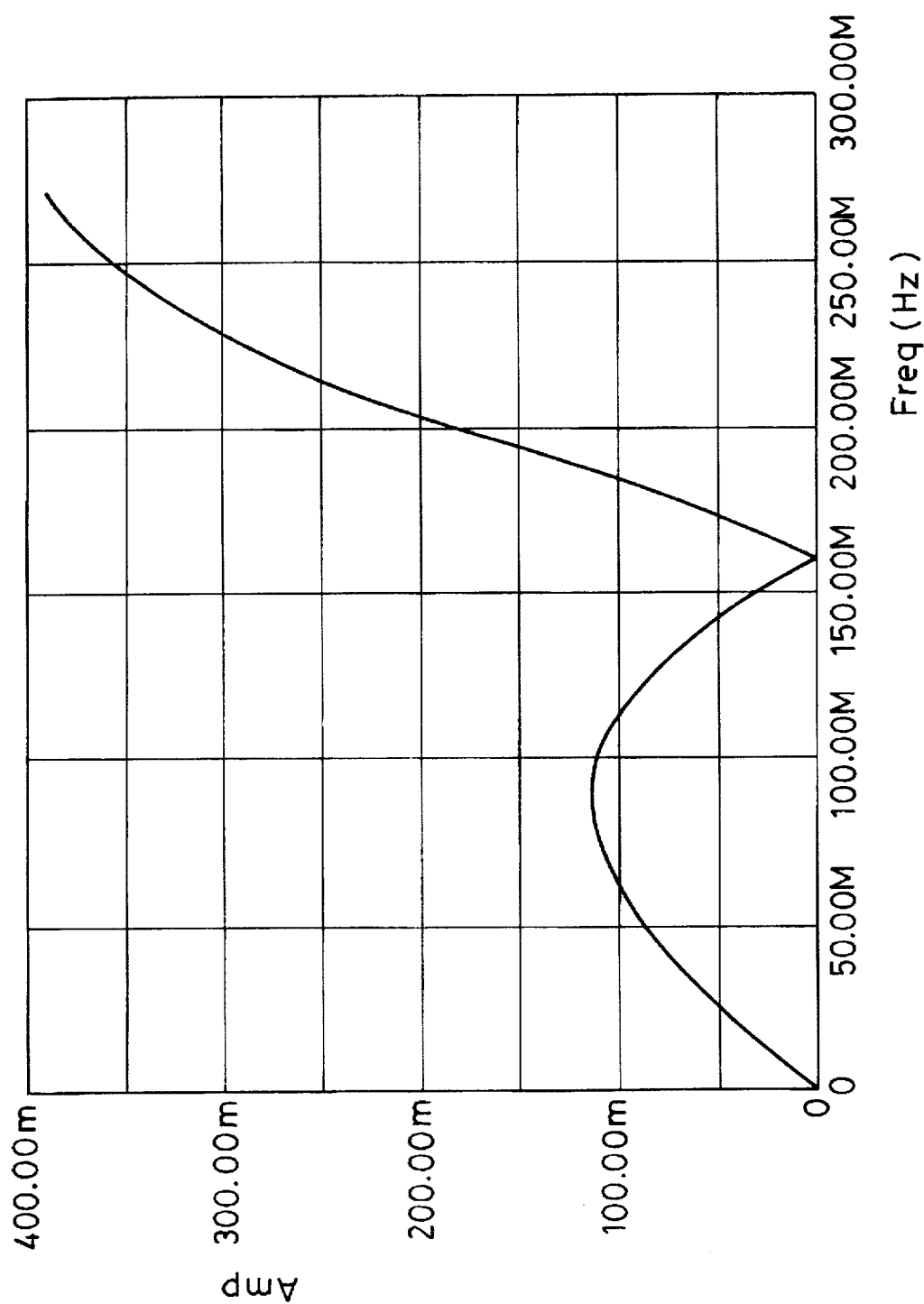
FIG. 6 shows the characteristic of a lower sideband wave suppressing filter.

A lower sideband wave of the FM signal modulated by the modulator 102 is suppressed by the lower sideband wave suppressing filter 103. The characteristic of the filter 103 is shown in FIG. 6. The filter 103 has the characteristic of linearly suppressing the lower sideband wave at 193 MHz±10 MHz by utilizing the right upward slope near 200 MHz, and, for example, the second lower sideband wave of 169 MHz is suppressed approximately 12 dB more than the carrier. As a result, it is possible to damp the return of the spectrum at 0 frequency after the low band conversion. The spectrum of the output of the lower sideband wave suppressing filter 103 is shown in FIG. 5(b).

The lower sideband wave suppressing filter 103 can be composed of an extremely simple electrical network, for example, a network having one inductance.

Then, the modulating signal is heterodyned by the mixer 104. The frequency of the local oscillator 105 is 174 MHz, and the FM signal of the carrier of 193 MHz is, as shown in FIG. 5(c), converted into a carrier of 19 MHz by low band conversion. FIG. 5(c) shows the spectrum on the output side of the mixer 104.

Subsequently, as shown in FIG. 5(d), the frequency characteristic of the FM signal after the low band conversion is returned to a flat state (returned to a state before the suppression by the lower sideband wave suppressing filter 103) by using the lower sideband wave emphasizing filter 106 and finally, an unnecessary high band is cut by the low-pass filter 107.

FIG. 5(d) shows the spectrum on the output side of the low-pass filter 107. As shown in the figure, primary upper and lower sideband waves are even in level and other waves including the secondary lower sideband wave which causes moire, are suppressed. As a result, it is possible to reduce the moire caused by the return of the spectrum at 0 frequency.

Furthermore, the lower sideband wave emphasizing filter 106 and the low-pass filter 107 can be realized by one electrical network. The characteristic of the electrical network is shown in FIG. 7.

Figure 7:
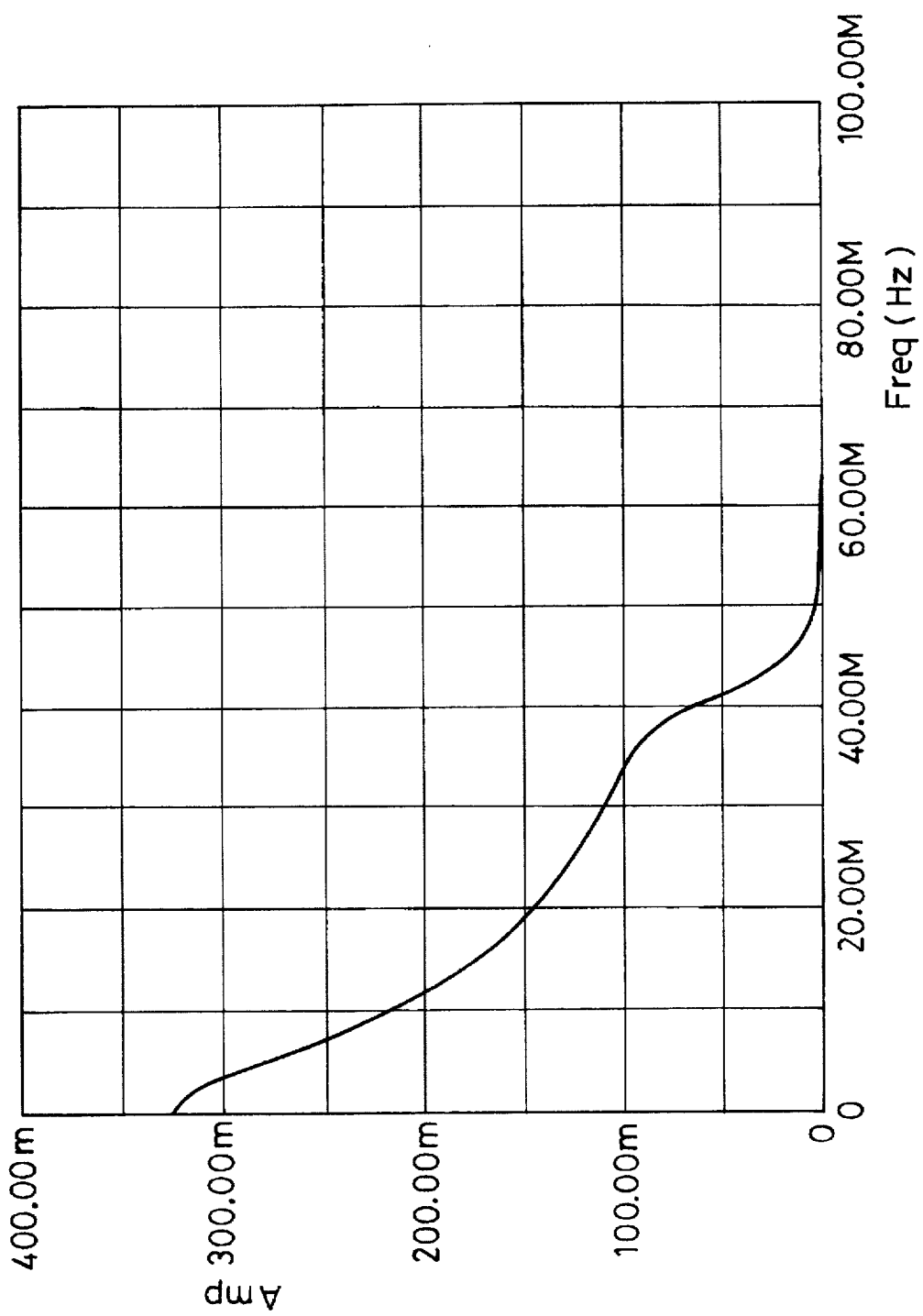
FIG. 7 shows the characteristic of a lower sideband wave emphasizing low-pass filter.

The cut-off frequency of the low-pass filter 107 is approximately 40 MHz and the shoulder near 40 MHz in FIG. 7 corresponds to the cut-off frequency.

In the case of a frequency lower than the above frequency, the characteristic whose center is 19 MHz is opposite to the characteristic of the lower sideband wave suppressing filter 103 whose center is 193 MHz, and flattens the frequency characteristic of the final FM signal.

Thus, in the embodiment, it is possible to suppress the lower sideband wave which causes moire arising from the return of the spectrum at 0 frequency by combining the lower sideband suppressing filter 103 for smoothly suppressing the lower sideband and the lower sideband wave emphasizing filter 106 having the characteristic opposite to that of the lower sideband wave suppressing filter 103 (compare FIGS. 6 and 7). Furthermore, since this kind of frequency processing circuit can be composed without using a band-pass filter having a VHF band whose composition is complicated and thus the number of constituent elements can be reduced, it is possible to reduce the cost and to enhance the reliability of the frequency processing circuit.

Though, in the embodiment, the present invention is applied to the frequency processing circuit on the recording side of the VTR shown in FIG. 1, the present invention may be applied to a frequency processing circuit on the reproducing side of the VTR.

As described above, according to the present invention, it is possible to suppress the lower sideband wave which causes moire by using the lower sideband wave suppressing filter and the lower sideband emphasizing filter in the same manner as in the case where a high-definition band-pass filter is used.

In addition, according to the present invention, as it is unnecessary to use a band-pass filter having a large number of elements and a complicated composition, it is possible to reduce the cost of the frequency processing circuit of the present invention, make its size smaller, enhance its reliability, and furthermore, easily adjust it.

What is claimed is:

1. A frequency processing circuit, comprising:
   suppressing means for suppressing a lower sideband wave of an input FM signal whose frequency is modulated, said suppressing means suppressing a portion of the input FM signal, the suppressed portion being related to the lower sideband frequency of said input FM signal;
   frequency conversion means for converting the frequency of an output of said suppressing means; and
   emphasizing means for emphasizing the lower sideband wave portion of an output of said frequency conversion means, said emphasizing means emphasizing the portion of the wave suppressed by said suppressing means relatively more than unsuppressed portions of the output of said frequency conversion means.

2. A frequency processing circuit according to claim 1, wherein said suppressing means includes a lower sideband wave suppressing filter for suppressing the lower sideband wave of the input FM signal.

3. A frequency processing circuit according to claim 1, wherein said emphasizing means includes a lower sideband wave emphasizing filter for emphasizing the portion of the wave suppressed by said suppression means.

4. A frequency processing circuit according to claim 3, wherein said lower sideband wave emphasizing filter includes a low-pass filter.

5. A frequency processing circuit according to claim 1, wherein said suppressing means and said emphasizing means have substantially opposite suppressing and emphasizing characteristics.

6. A frequency processing circuit for converting the frequency of an input signal having a predetermined frequency and outputting the converted signal, said frequency processing circuit comprising circuitry for (1) suppressing a lower sideband wave before converting the frequency, the suppressed lower sideband wave portion being related to a lower sideband frequency of the input signal, and (2) then emphasizing the suppressed lower sideband portion after converting the frequency but before outputting the converted signal, said circuitry emphasizing the suppressed lower sideband portion relatively more than unsuppressed portions.

7. A frequency processing circuit according to claim 6, wherein the suppressing characteristic and the emphasizing characteristic for said lower sideband wave are substantially opposite to each other.

8. A signal processing apparatus comprising:
   (a) a first means for converting an input first frequency signal into a second frequency signal;
   (b) a second means, coupled to an input of said first means, for suppressing a lower sideband portion in said first frequency signal; and
   (c) a third means, coupled to an output of said first means, for emphasizing frequency elements corresponding to said lower sideband portion suppressed by said second means, said third means emphasizing the suppressed lower sideband portion relatively more than unsuppressed frequency elements.

9. A signal processing apparatus according to claim 8, wherein said lower sideband portion elements suppressed by said second means includes a lower sideband wave.

10. A signal processing apparatus according to claim 8, wherein said second means includes a lower sideband wave suppressing filter for suppressing the lower sideband wave of an input FM signal.

11. A signal processing apparatus according to claim 8, wherein said third means includes a lower sideband wave emphasizing filter for emphasizing the portion of the wave suppressed by said second means.

12. A signal processing apparatus according to claim 8, wherein said second and third means have substantially opposite suppressing and emphasizing characteristics.

* * * * *

UNITED STATES PATENT AND TRADEMARK OFFICE
CERTIFICATE OF CORRECTION

PATENT NO. : 5,729,828
DATED : March 17, 1998
INVENTOR(S) : MAKOTO GODA, ET AL.

It is certified that error appears in the above-identified patent and that said Letters Patent is hereby corrected as shown below:

Title page, item
[56] REFERENCES CITED

U.S. PATENT DOCUMENT, line 14, "Lohemann" should read --Lohrmann--.

Column 1

Line 19, "a FM" should read --an FM--.
    Line 61, "memory are" should read --memory 524 are--.
    Line 63, "and 529" should read --528 and 529--.

Column 2

Line 26, "a FM" should read --an FM--.
    Line 32, "a FM" should read --an FM--.

Column 3

Line 57, "shows" should read --show--.

UNITED STATES PATENT AND TRADEMARK OFFICE
CERTIFICATE OF CORRECTION

PATENT NO. : 5,729,828
DATED : March 17, 1998
INVENTOR(S) : Makoto Goda, et. al.

It is certified that error appears in the above-identified patent and that said Letters Patent is hereby corrected as shown below:

Column 4

Line 4, "a FM" should read --an FM--.
    Line 12, "a FM" should read --an FM--.

Signed and Sealed this

Ninth Day of February, 1999

Attest:

Attesting Officer

Acting Commissioner of Patents and Trademarks